United States Patent
Rampe et al.

[11] 3,830,577
[45] Aug. 20, 1974

[54] METHOD AND MEANS FOR CONNECTING AN APERTURED PART TO A SHAFT

[75] Inventors: John W. Rampe, Mayfield Heights; W. Charles Rampe, Mentor, both of Ohio

[73] Assignee: Rampe Research, Cleveland, Ohio

[22] Filed: June 5, 1972

[21] Appl. No.: 259,470

[52] U.S. Cl.................... 403/378, 29/526, 403/356
[51] Int. Cl.......................... F16d 1/06, B23p 19/02
[58] Field of Search.................... 29/526; 287/52.08; 403/283, 373, 378, 356

[56] References Cited
UNITED STATES PATENTS

| | | | |
|---|---|---|---|
| 836,706 | 11/1906 | Richards | 403/373 |
| 2,437,305 | 3/1948 | Nickle | 287/52.08 |
| 2,444,922 | 7/1948 | Deetman | 403/373 |
| 3,047,318 | 7/1962 | Berkshire | 287/52.08 |
| 3,612,582 | 10/1971 | Pitner | 403/373 X |

OTHER PUBLICATIONS

"15 Ways to Fasten Gears to Shafts," Product Engineering, May 30, 1960, pages 43–47.

*Primary Examiner*—Charles W. Lanham
*Assistant Examiner*—D. C. Reiley, III
*Attorney, Agent, or Firm*—Watts, Hoffmann, Fisher & Heinke Co., L.P.A.

[57] ABSTRACT

A method and means for drivingly coupling apertured parts such as pulleys, gears and wheels to a shaft. The hub of an apertured part is provided with a radially extending hole. A pointed hardened pin is positioned in the hole with its pointed end engaging the shaft and with its opposite end extending radially outwardly of the hub. A clamping band is crimped in place around the hub so as to force the pin radially inwardly thereby driving the pointed end of the pin into the shaft.

35 Claims, 5 Drawing Figures

PATENTED AUG 20 1974 3,830,577
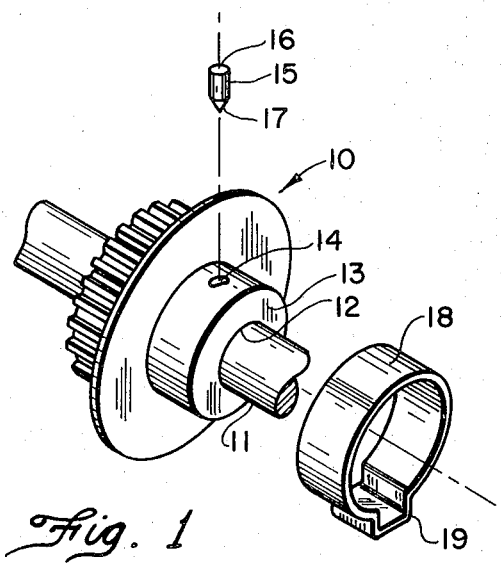
Fig. 1
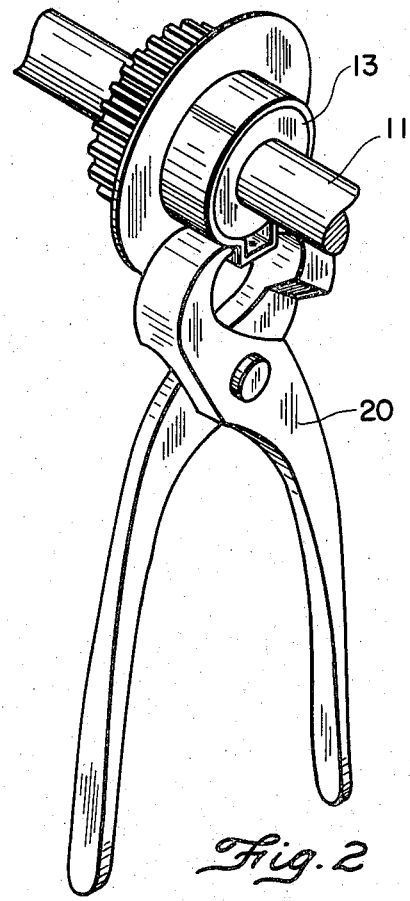
Fig. 2
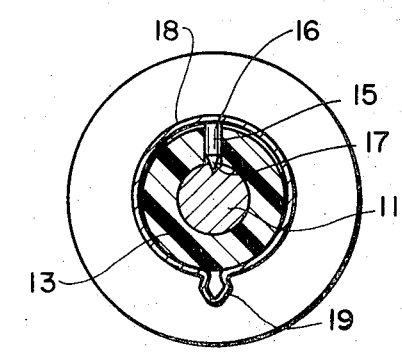
Fig. 3
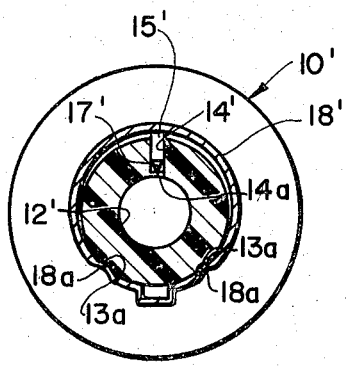
Fig. 5
Fig. 4

METHOD AND MEANS FOR CONNECTING AN APERTURED PART TO A SHAFT

BACKGROUND OF THE INVENTION

1. Field of the Invention

The present invention relates generally to a novel and improved method and means for coupling apertured parts such as pulleys, gears and wheels to a shaft or rod received in the apertures of such parts, and more particularly to such a coupling means as can be used to couple plastic pulleys and gears to metallic rods or shafts.

2. Prior Art

A wide variety of fastening systems have been used to secure apertured parts at selected positions along a rod or shaft. Driving connections between such apertured parts and the rod or shaft have been provided by such fastening systems as keys of various configurations, threaded members such as set screws, pinning devices such as cotter pins and roll pins, and special mating shaft and pulley configurations such as splines or flats.

Such known fastening systems have a number of disadvantages when used to mount metallic parts on metallic shafts, and where such mounting systems are used to couple parts of relatively soft material, such as plastic these disadvantages are even more troublesome. By way of examples:

1. Keyways and splined type connections tend to develop stress concentrations which may eventually cause failure of the parts they connect. Where the connected parts are formed of plastic the splined or keyed connections are subject to shear at relatively light torque loadings.

2. Set screws mounted in threaded apertures tend to loosen their grip as the threads deform. Where the threads are formed in plastic, they tend to fatique and deform relatively quickly causing the connected parts to become relatively movable.

3. Pinned type couplings tend to develop stress concentrations and are characterized by relatively high cost. Since pinned connections require aligned apertures through the pulley and shaft, both the pulley and shaft are ordinarily provided with pre-formed holes. The pre-formed holes must be exactly located to assure proper positioning of the pulley. This is a relatively costly operation involving close tollerances. The requisite mounting holes also serve to weaken the shaft and the pulley hub, thereby requiring the size of these members to be increased. Moreover, the resulting pulley mounting cannot be adjusted so as to move the pulley axially to correct for minor misalignments or design changes.

Still another problem is the relative cost of using known fastening systems to mount plastic parts. Small plastic pulleys, gears and wheels can now be formed at extremely low costs, thus enabling significant cost reductions in many light load applications in small machinery. This cost savings can well be lost, however, where the fastening system required to mount the plastic parts is, itself, relatively expensive or consumes any significant amount of installation time. Where, for example, the fastening system employs hardened set screws, the set screws may well cost nearly as much as the plastic parts they mount. A plurality of set screws are sometimes used to mount a single plastic part in order to distribute the loading and provide a connection which will not readily loosen. In such instances, the set screws may well cost more than the part they mount. Moreover, during installation the set screws must be threaded into the part and then individually tightened so as to clamp against the shaft. This operation can be unduly time consuming where the parts are small and the working space limited.

SUMMARY OF THE INVENTION

The present invention overcomes the foregoing drawbacks of the prior art and provides a novel and improved, simple and inexpensive method and means for securing such apertured parts as pulleys, gears and wheels to shafts.

The pulley, gear or other part which is to be mounted on a shaft is provided with a mounting aperture of such diameter as will mount the part without significant play on the shaft. A cylindrical hub is provided on the part concentric with the mounting aperture. One or more holes extend radially through the hub in communication with the mounting aperture.

A separate hardened pin is slip-fitted into each of the radially extending holes. When the inner ends of the pins are brought into contact with the shaft, the outer ends of the pins extend slightly outwardly of the hub. The inner end of each of the pins have a point in engagement with the shaft. The pin point is of a material which is harder than the material forming the shaft.

A clamping device is provided having an internal diameter sufficient to permit its being positioned over the hub around the region wherein the outer ends of the pins project from the hub. The clamping device is then tightened so as to force the pins inwardly, driving their pointed inner ends into the shaft. A driving connection between the part and the shaft is thereby established since the engagement between the pin points and the shaft prevents their relative rotation, and the positioning of the pins in the holes of the part prevents their relative rotation.

In the preferred embodiment, the clamping means comprises an endless metallic band of generally cylindrical shape except for a single radially extending U-shaped projection. The band is preferably installed with the U-shaped projection on the opposite side of the hub from the pins, and is clamped in place by pressing the sides of the projection toward each other.

A connection of this type can be formed in a very short matter of time by simply dropping the hardened pins into the holes in the hub, sliding the endless band over the hub, and clamping the band with a pliers-like tool. The connection so formed is rigid, long-lasting, and involves a minimum of expense. Moreover, the apertured parts can be mounted by this system at any desired position along a shaft since no pre-drilled hole or other shaft formation is required for mounting.

While the present invention is not restricted in its application for use with apertured part and shafts of any particular material, it has a number of advantages when used to mount plastic parts on metallic shafts. Since the clamping band exerts a radially inwardly compressive force on the hub of the apertured part, the hub can be formed with thinner walls than is possible with other known mounting systems. Moreover, the radial compression to which the hub is subjected serves both to clamp the apertured part snugly on the shaft and to clamp the pointed mounting pins in their holes.

In effect, since the plastic hubs are relatively soft and deformable, the clamping bands serve to pre-stress the hubs in such a fashion as will oppose the loosening effect of material fatique. Accordingly, the mounting system of the present invention provides a plastic-part-to-metallic-shaft connection which is substantially longer-lived than most known connection systems, which is far less costly than most known systems, which requires a minimum of installation time, and which is versatile in the sense that a part can be mounted at any selected position along the shaft.

Accordingly, it is a general object of the invention to provide a novel and improved, simple and inexpensive method and means for securing apertured parts such as pulleys, gears and wheels to rod-like structures such as shafts.

It is another object to provide such a mounting system which has particular advantages when used to mount plastic parts on metallic shafts.

Other objects and a fuller understanding of the invention may be had by referring to the following description and claims taken in conjunction with the accompanying drawing.

BRIEF DESCRIPTION OF THE DRAWING

FIG. 1 is a perspective view showing the mounting means of the present invention prior to its being positioned so as to rigidly couple an apertured part to a shaft;

FIG. 2 is a perspective view similar to FIG. 1 but with the mounting means of the present invention being clamped in place so as to couple the shaft to the apertured part;

FIG. 3 is a cross-sectional view of the mounting means positioned about the apertured part and shaft prior to being clamped in place;

FIG. 4 is a cross-sectional view similar to FIG. 3 but with the mounting means clamped in place; and, FIG. 5 is a cross-sectional view of an apertured part with the mounting means pre-assembled thereon in such a way as to maintain the integrity of the assembly during shipment and installation.

DESCRIPTION OF THE PREFERRED EMBODIMENT

Referring to FIG. 1, an apertured part such as a pulley is shown generally at 10. A shaft 11 extends through a mounting aperture 12 formed centrally of the pulley. The mounting aperture 12 is of such inner diameter as will permit the pulley 10 to be positioned without significant play on the shaft 11.

The pulley 10 includes a cylindrical mounting hub 13 formed concentric with the mounting aperture 12. A radially extending hole is provided through one side of the hub 13 in communication with the mounting aperture 12. A hardened pointed pin 15 is inserted into the hole 14. The pin 15 is of such diameter as will permit it to slip fit within the hole 14, and is of such length as will cause its outer end 16 to project radially outwardly of the hub 13 when its pointed inner end 17 is in contact with the shaft 11.

An endless band clamping device 18 is provided for positioning around the hub 13. The clamping device 18 is cylindrical except for a radially extending U-shaped projecting portion 19. The clamping device 18 is slip fitted over the region of the hub 13 which includes the projecting outer end 16 of the pin 15. As illustrated in FIG. 3, the clamping device 18 is preferably positioned such that the projecting U-shaped portion 19 is on the opposite side of the hub from the pin 15.

The clamping device 18 is tightened about the hub 13 by crimping the sides of the U-shaped projection 19 toward each other. As shown in FIG. 2, a pliers-like tool 20 is used to engage opposite sides of the projection 19 and to crimp these sides toward each other. Such tightening of the clamping device forces the pointed end 17 of the pin 15 into the shaft 11. The deformed clamping device 18 retains its deformed configuration, as shown in FIG. 4, and exerts a continuous radially inward force on the outer end 16 of the pin 15.

The mounting system of the present invention can be used with apertured parts and shafts of a wide variety of materials. The present invention has particular advantages, however, when used to mount apertured parts of relatively soft material such as plastic on shafts of relatively hard material such as metal. Where the hub of the apertured part is relatively soft so as to be slightly deformed under the radially inwardly compressive force of the clamping band, the hub is caused to clamp tightly around the shaft and around the mounting pins. In effect, the clamping band serves to pre-stress the hub so as to oppose such material fatigue as tends to loosen the hub on the shaft and the pins within the hub. Accordingly, a plastic-part-to-metallic-shaft connection is provided which is substantially longer lived than can be provided with most known mounting systems.

The pins 15 are provided in such lengths and diameters as are suitable for use with various sizes of mounting hubs. The included angle on the pin point is preferably about 60°. A 90° included angle is too blunt to bite sufficiently into most metal shafts, and included angles of much less than 60° result in too long and too weak a pin-point.

A plurality of pins 15 may also be used. Preferably they are positioned such that their axes are in a common plane on the opposite side of the hub from the crimped projection 19. However, as will be apparent, the pins 15 can also be positioned along spaced radially extending axes around the hub 13.

The clamping means 18 may assume other forms than that shown, but in the preferred embodiment comprises such one-piece hose clamps as are sold under the trademark OETIKER by Oetiker, Inc., 60 Okner Parkway, Livingston, N.J. 07039.

Referring to FIG. 5, a clamping band 18', a pointed pin 15', and the pulley 10' are shown assembled in such a fashion as will maintain the integrity of the assembly during shipment and installation. In this embodiment of the invention, a pin mounting hole 14' is provided with a restricted or closed inner end 14a which prevents the pin point from entering the shaft receiving aperture 12'. The clamping band 18' is provided with one or more radially inwardly extending dimples 18a which extend into recesses 13a formed in the hub 13' to hold the clamping band 18' axially in place on the hub 13'.

The assembly of FIG. 5 is installed on a shaft simply by positioning the pulley 10' in place on the shaft, and then crimping the band 18', as previously described, with a pliers-like tool. As the band 18' is crimped into place, the pin 15' is forced radially inwardly such that the pin point 17' is caused to penetrate or extend through the restricted hole end 14a and into engagement with the shaft.

While the preferred embodiment has been described in conjunction with a pulley having a distinct hub region, it will be apparent that the present invention is equally well applied to such gears, wheels, pulleys or other apertured parts as do not have a distinct and separately identifiable hub. A wide variety of parts having telescopically interfitting portions may readily be connected by the system of the present invention.

Although the foregoing description is necessarily of a detailed character, in order that the invention may be set forth it is to be understood that the specific terminology is not intended to be restrictive or confining, and that various rearrangements of parts and modification of detail may be resorted to without departing from the scope or spirit of the invention as hereinafter claimed.

What is claimed is:

1. A method of securing an apertured hub portion of a part to an elongated member received within the aperture of the hub portion, comprising the steps of:
   a. providing the hub portion with a passageway the outer end of which opens through a peripheral surface of the hub portion and the inner end of which communicates with the aperture;
   b. slip-fitting a pointed pin into said passageway in non-threaded relationship with the hub portion such that the pointed end extends through said inner end and into engagement with a non-apertured portion of the peripheral surface of the elongated member while the opposite end extends outwardly of said outer end and projects beyond said peripheral surface;
   c. positioning a clamping device around said peripheral surface of the hub portion so as to engage said opposite end; and,
   d. clamping said clamping device about said peripheral surface so as to force the pointed end of said pin into the elongated member and to hold said pin in such position thereby establishing a rigid connection between the hub portion and elongate member.

2. The method of claim 1 wherein said pin comprises a harder material than said hub portion, and said step of clamping is conducted in such a way as to result in the exertion of a force substantially axially on the pin so as to drive the pin axially along said passageway and into said elongated member without deforming the walls of said passageway.

3. The method of claim 1 wherein said clamping device comprises a deformable endless band and said step of clamping comprises deforming said band so as to clamp said band about the hub portion.

4. The method of claim 3 wherein said endless band is generally cylindrical except for a radially extending U-shaped projection, and said step of clamping comprises the steps of engaging opposite sides of said projection with a pair of movable jaws and moving the jaws together so as to permanently deform portions of said projection.

5. The method of claim 4 wherein said step of positioning the clamping device includes the steps of positioning said projection on the opposite side of the hub portion from said passageway.

6. A method of securing an apertured part to an elongated member extending into the aperture of the part, comprising the steps of:
   a. providing the apertured part with a generally cylindrical hub portion through which the aperture and elongated member extend;
   b. providing at least one hole extending in a generally radial direction through said hub portion in communication with said aperture;
   c. slip-fitting a pointed pin in said hole in non-threaded relationship with the hub portion with the pointed end of the pin in engagement with a non-apertured portion of the peripheral surface of the elongated member and the opposite end of the pin projecting radially outwardly of said hub portion;
   d. positioning a clamping device around the pheripheral surface of said hub portion in the region of said hole so as to engage said opposite end; and,
   e. clamping said clamping device in place about said pheripheral surface so as to force said pointed end of said pin into the elongated member and to hold said pin in such a position thereby establishing a rigid connection between the apertured part and the elongated member.

7. The method of claim 6 wherein said pin comprises a harder material than said hub portion, and said step of clamping is conducted in such a way as to result in the exertion of a force substantially axially on the pin so as to drive the pin axially into said hole and into said elongated member without deforming the walls of said hole.

8. The method of claim 6 wherein said clamping device comprises a deformable endless band and said step of clamping comprises deforming said band so as to clamp said band about the hub portion.

9. The method of claim 8 wherein said endless band is generally cylindrical except for a radially extending U-shaped projection, and said step of clamping comprises the steps of engaging opposite sides of said projection with a pair of movable jaws and moving the jaws together so as to permanently deform portions of said projection.

10. A method of securing an apertured plastic part to a metallic shaft extending through the aperture of the part, comprising the steps of:
    a. providing the part with a cylindrical mounting hub concentric with the aperture, and having a radially extending passageway through the hub communicating with the aperture;
    b. positioning the part at the desired location along the shaft;
    c. inserting a pointed pin into said passageway in non-threaded relationship so that the pointed end of the pin engages a non-apertured portion of the peripheral surface of the shaft while the opposite end of the pin extends radially outwardly of the hub;
    d. positioning a deformable endless clamping means around the pheripheral surface of the hub with the inner surface of the clamping means in engagement with said opposite end of the pin; and,
    e. deforming said clamping means so as to force the pointed end of said pin into the shaft and to hold said pin in such position thereby establishing a rigid connection between the part and the shaft.

11. The method of claim 10 wherein said pin comprises a harder material than said hub, and said step of clamping is conducted in such a way as to result in the exertion of a force substantially axially on the pin so as to drive the pin axially along said passageway and into said shaft without deforming the walls of said passageway.

12. The method of claim 10 wherein said clamping device comprises an endless band of generally cylindrical configuration except for a radially extending U-shaped projection, and said step of deforming said clamping device comprises engaging opposite sides of said projection with a pair of movable jaws and moving the jaws together so as to reduce the inner diameter of said clamping device thereby clamping it about said hub and simultaneously driving said pin into the shaft.

13. The method of claim 12 wherein said step of positioning said clamping device includes the step of positioning said projection on the opposite side of the hub from said pin such that the locus of deformation of the projection is spaced approximately 180° on either side of said pin.

14. A method of rigidly mounting a generally cylindrical apertured hub on a shaft which extends through the aperture along an axis concentric with the cylindrical hub, comprising the steps of:
   a. forming a radially extending passageway through the hub in communication with the aperture;
   b. inserting a pointed pin into said passageway in non-threaded relationship so that the pointed end of the pin engages a non-apertured portion of the peripheral surface of the shaft;
   c. forcing the pointed end of the pin into the shaft; and,
   d. clamping a clamping device around the peripheral surface of the hub so that the pin is maintained in position with the pointed end extending into the shaft.

15. The method of claim 14 wherein said pin comprises a harder material than said hub, and said step of forcing the pointed end into the shaft is conducted in such a way as to result in the exertion of a force substantially axially on the pin so as to drive the pin axially along said passageway and into said shaft without deforming the walls of said passageway.

16. A method of fastening together first and second members comprising the steps of:
   a. forming an aperture in said first member of such size as will receive a portion of the second member without significant play therebetween;
   b. forming a passageway in said first member so as to intersect said aperture;
   c. inserting said portion of the second member into said aperture;
   d. positioning a pointed pin in said passageway in non-threaded relationship with the first member with the pointed end thereof in engagement with a non-apertured portion of the peripheral surface of said portion of the second member;
   e. exerting pressure on said pin so as to force said pointed end into the second member while other portions of said pin remain within said passageway; and,
   f. clamping a clamping device around the pheripheral surface of said first member so that said pin is held in position with said pointed end within said second member thereby establishing a rigid connection between said first and second members.

17. The method of claim 16 wherein said first member comprises a relatively soft material such as plastic, said second member comprises a relatively hard material such as metal, and said pin is formed of metal and has a point of greater hardness than the material comprising said second member.

18. The method of claim 17 wherein said step of exerting pressure on said pin comprises subjecting said pin to a force which is axial relative to said pin such that minimal force is exerted by said pin against the walls of said passageway and maximal force is transmitted along the axis of said pin to said pointed end so as to effect entry of said pointed end into said portion of said second member without deforming the walls of said passageway.

19. A method of fastening together two telescopically interfitting portions of a first part and a second part, the outer one of said portions having an aperture forming a pin engaging surface and the inner one of said portions being initially free of any pin receiving aperture, comprising the steps of:
   a. positioning a pin in said aperture and in non-threaded engagement with each of the parts;
   b. positioning a circumferential band around the pheripheral surface of said outer portion and engaging the pin;
   c. clamping the band around the outer portion so as to compressively engage the pin thereby bringing the pointed end of the pin into compressive relatively immovable engagement with the inner of said portions and holding the pointed end of the pin in contact therewith to establish a driving connection between the two parts.

20. The method of claim 19 wherein the circumferential band comprises a deformable endless band, and said step of clamping the band comprises deforming the band so as to clamp the band around the outer portion.

21. The method of claim 19 wherein the outer portion has a radially extending hole extending through it, and the pointed pin has a hardened point positioned radially inwardly in the hole in engagement with the other surface, such that clamping of the band will cause the pointed pin to move radially inwardly so as to penetrate into the other surface.

22. In combination:
   a. first and second parts having respectively inner and outer telescopically interfitting portions;
   b. each of said portions having pin engaging surfaces;
   c. a pointed pin in non-threaded engagement with said surfaces;
   d. a circumferential band arount the outer of said portions and engaging said pin; and,
   e. said pin being held by the band in relatively immovable engagement with the two parts and in an aperture formed by the pin in the inner portion whereby said two parts are maintained in fixed relative position.

23. The combination of claim 22 wherein said band comprises a deformable endless band deformed during assembly so as to compress said pin against said other surface.

24. The combination comprising an apertured part coupled to an elongated member by means of a pointed pin, the elongated member extending into the aperture of the part, the pointed pin being slip-fitted within a passageway extending through the part in communication with the aperture, the point of the pin extending into a hole formed by the pin in the elongated member while other portions of the pin extend within the passageway, and means around said apertured part clamping the pin in a position with the pointed end in the elongated member.

25. The combination of claim 24 wherein said point of said pin has an included angle of between approximately 45°–75°.

26. The combination of claim 25 wherein said included angle is approximately 60°.

27. The combination of claim 24 wherein:
   a. said apertured part comprises a generally cylindrical hub;
   b. said aperture extends generally concentrically through said hub;
   c. said passageway extends generally radially of said hub; and
   d. said pin is of such length as will permit the end opposite said pointed end to project radially outwardly of said hub when said pin is positioned in said position.

28. The combination of claim 24 wherein said clamping means comprises an endless band of generally cylindrical configuration except for a radially extending deformable U-shaped projection the sides of which are crimped together to effect closure of said clamping means.

29. Connection means for establishing a rigid connection between a hub and a shaft extending within the hub, comprising:
   a. a pointed pin slidable in non-threaded relationship within a radially extending passageway formed through the hub with the pointed end of the pin in engagement with a non-apertured portion of the shaft and the opposite end of the pin projecting radially outwardly of the hub; and,
   b. clamping means for surrounding the pheripheral surface of the hub and engaging the opposite end of the pin for clamping the hub so as to force the pointed end of the pin into the shaft and to hold the pin in such position.

30. The connection means of claim 29 wherein said clamping means comprises an endless band of generally cylindrical configuration except for a radially extending deformable U-shaped projection the sides of which are crimped together to effect closure of said clamping means.

31. The connection means of claim 30 wherein said pin comprises a harder material than said hub, and said clamping means is further adapted to exert a force substantially axially on said pin so as to drive the pin axially along said passageway and into the shaft without deforming the walls of said passageway.

32. The connection means of claim 30 wherein said pointed end defines an included angle of between approximately 45°–75°.

33. The connection means of claim 32 wherein said pointed end defines an included angle of approximately 60°.

34. The combination comprising:
   a. a plastic pulley having a cylindrical hub portion formed integrally therewith;
   b. an aperture extending through said hub portion concentric therewith;
   c. a passageway extending radially of said hub porion and in communication with said aperture;
   d. a shaft positioned in said aperture so as to mount said pulley without significant play therebetween;
   e. a hardened steel pin positioned in said passageway with the inner end of the pin in engagement with a hole formed by said pin in said shaft and the outer end extending radially outwardly of said hub;
   f. the inner end of said pin being pointed so as to define an included angle of between 45° and 75°; and,
   g. clamping means extending around said hub so as to exert a radially inward compressive force on portions of said hub and on said pin so as to hold said pin in such position.

35. A method for establishing a rigid connection between a generally cylindrical hub and a shaft extending concentrically through the hub, comprising the steps of:
   a. slip-fitting a pointed pin into a radially extending passageway formed through said hub in non-threaded relationship with the hub so that the pointed end of the pin engages a non-apertured portion of the shaft, the pin being of a length such that the opposite end of the pin from the pointed end projects radially outwardly of the hub; and,
   b. positioning clamping means around the pheripheral surface of the hub in engagement with said opposite end of the pin, and exerting force on the clamping means to force the pointed end of the pin into the shaft, and thereafter holding the pin in such position with the clamping means.

* * * * *